Aug. 15, 1939.    R. SCHENBECK    2,169,453
COAL CHUTE CARRIER
Filed June 19, 1937    2 Sheets-Sheet 1

Inventor:
Rufus Schenbeck.
By:- Tefft & Tefft
Att'ys.

Aug. 15, 1939.  R. SCHENBECK  2,169,453
COAL CHUTE CARRIER
Filed June 19, 1937  2 Sheets-Sheet 2
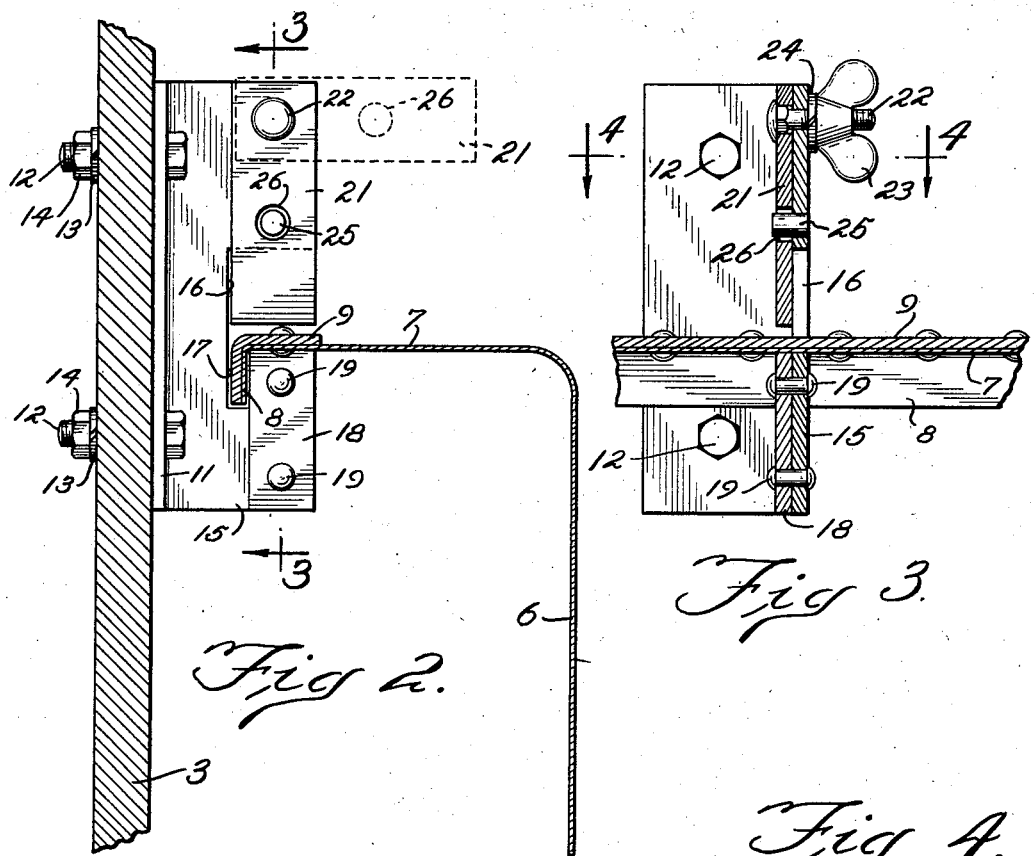
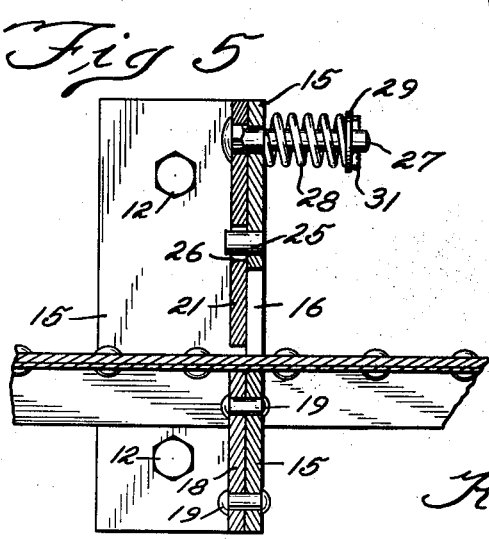
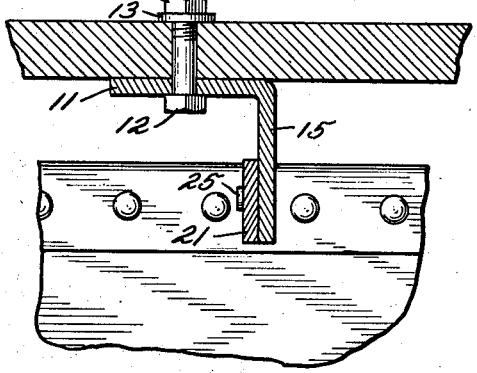
Inventor:
Rufus Schenbeck.
By:- Tefft + Tefft
Att'y.

Patented Aug. 15, 1939

2,169,453

UNITED STATES PATENT OFFICE 2,169,453

COAL CHUTE CARRIER

Rufus Schenbeck, Toledo, Ohio

Application June 19, 1937, Serial No. 149,143

2 Claims. (Cl. 224—29)

This invention relates to material handling trucks and the like and more particularly to a device for detachably securing a chute or the like to the side or other portion of a truck body in such manner that the chute may be carried about from place to place without danger of coming off and yet may be quickly detached and positioned for delivering the load of material such as coal or crushed stone to a place of deposit thereof.

Accordingly one of the primary objects of the invention is to provide a relatively simple and inexpensive device which may be permanently or otherwise attached to a truck body wall or the like and which will secure and support a delivery chute to the truck body for transportation to such place as the chute may be desired for delivery use.

Another object of the invention is to provide a device of the character mentioned so constructed that while the chute is securely held and positioned with respect to the truck body during transportation of the truck, the operator may quickly and easily release and remove the chute and as quickly and easily replace the same in secured position with respect to the truck body.

Many other objects as well as the advantages and uses of the invention will be or should become apparent after reading the description and claims and after viewing the drawings in which:

Fig. 2 is a section through the truck body looking forward and taken along the line II—II of Fig. 1.

Fig. 3 is a section taken along the line III—III of Fig. 2.

Fig. 4 is a section taken along the line IV—IV of Fig. 3, and

Fig. 5 is a view corresponding to the view in Fig. 3 of a modified form of the invention.

Figure 1:
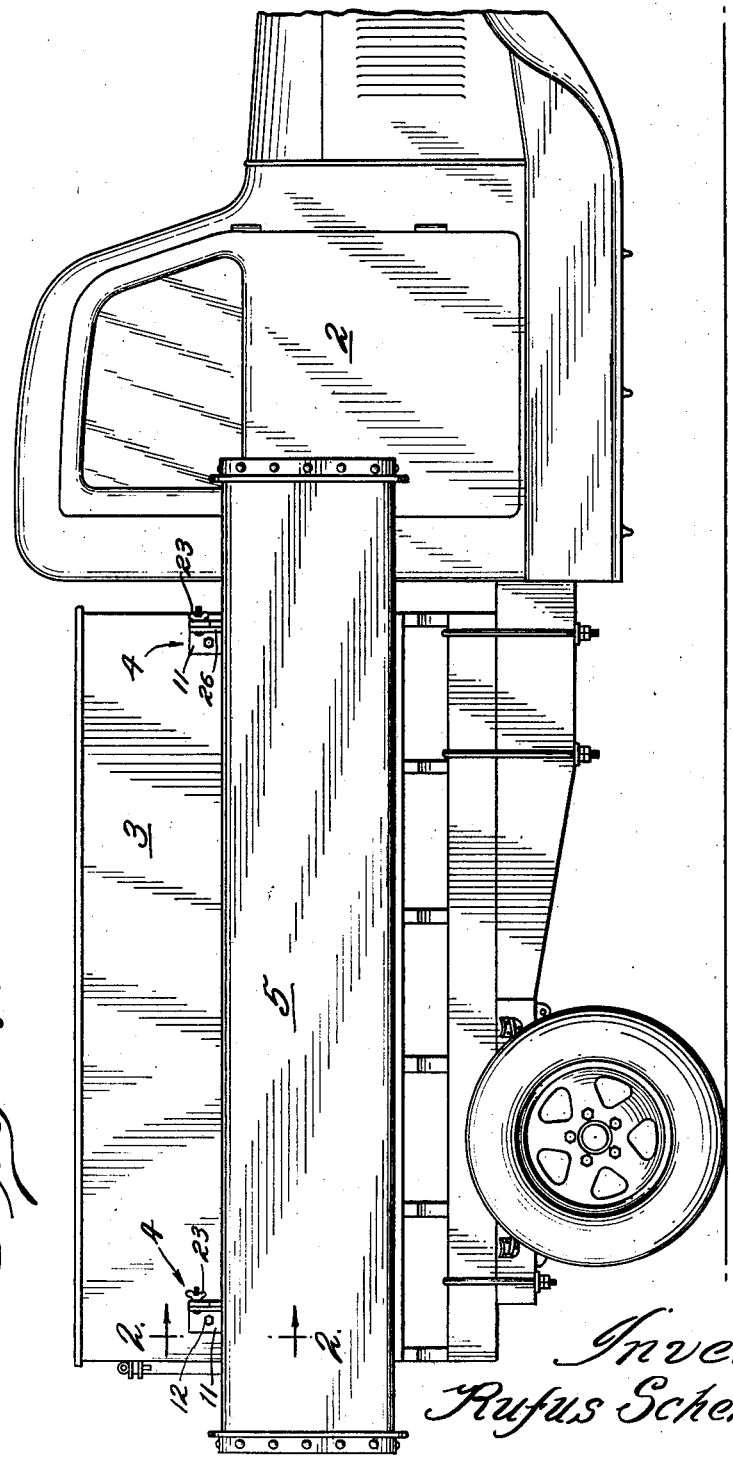
Fig. 1 is a side elevation of a truck body showing a coal chute or the like secured along the side thereof by one form of the invention.

The automobile truck illustrated in Fig. 1 may, for the purpose of description, be considered to be a coal truck the cab of which is generally designated 2 and the body is generally designated 3. Attached to the side wall of the body 3 are a pair of brackets, generally designated 4, arrayed in spaced relation to one another toward the fore and rear portions of the body side wall and to which and with which a coal chute or the like generally designated 5 is secured and secured to the truck body. The chute is of the ordinary type well known in the art, comprising a sheet steel channel (see Fig. 2) including a bottom portion 6 from which vertical side walls 7 (one only shown) arise. The upper ends of the side walls may be turned inwardly over the channel as shown at 8 and may be reinforced by angle irons 9 extending throughout the length of the inturned portion or lip 8.

Each bracket or hanger 4 may be composed of a piece of angle iron one leg 11 of which may be drilled for the reception of bolts 14 which together with lock washers 13 and nuts 14 serve to secure the bracket or hanger to the truck body wall 3 on the outside thereof. The other leg 15 of the angle iron is notched intermediate its ends and at its outer edge to provide an outwardly opening notch 16 of a width equal to or somewhat greater than the vertical distance between the inner marginal edge of the lip 8 and the exterior surface of the chute side wall including the angle iron reinforcing member 9. This notch is also of substantial depth for a purpose which will appear. The leg 15 is also notched to provide a notch 17 extending downwardly from the notch 16 at the back thereof for the reception of the lip 8 of the side wall of the chute and is of a width sufficient to permit the lip to be disposed therein with a not unreasonable amount of play. The depth of the notch 17, of course, is substantially equal to the distance from the inner marginal edge of the lip 8 to the inside of the side wall 7 of the chute, along a perpendicular.

In order to give a slightly greater bearing surface for the chute when hung on the bracket or hanger, and in order to reinforce the leg 15, a plate 18 may be riveted as by rivets 19 or otherwise fastened to the leg 15 as clearly shown in Figs. 2 and 3.

The upper portion of the leg 15 pivotally supports a latch member 21 upon a pivot stud 22 which is disposed through a drilled aperture in the leg. A wing nut or the like 23 and a lock washer 24 may serve to draw the latch member 21 tightly against the leg as will be understood. Below the pivot or stud 22 is a stud 25, riveted, welded or otherwise firmly secured to the leg 15 while the latch member 21 is drilled to provide an aperture 26 adapted to receive the projecting end of stud 25 when the latch member is disposed in chute retaining position as shown in full lines in Figs. 2 and 3.

When the coal chute is to be hung upon the side of the truck and secured thereto for transportation the lip portion is moved through the slot 16 and deposited or permitted to drop into the slot 17 in which position the inside surface of the side wall 7 may rest upon the top edge of the reinforcing plate 18 and the adjacent edge of the leg 15. The latch member 21 which is of a length sufficient to permit its bottom edge to lie closely adjacent to the external surface of the side wall of the chute when in chute retaining position, will then be swung from the dotted line position to the full line position as shown in Fig. 2. Of course, in order to permit the latch to move over the pin or stud 25 and to a position where the stud 25 will enter the aperture 26 the wing nut 23 must be loosened to the necessary extent. After the chute has been disposed within the hanger notch 17 and the latch member 21 has been disposed in latching or retaining position as shown in full lines in Fig. 2 the operator will tighten the wing nut 23. The same operations are performed in order to secure the chute 2 to the other latch or hanger. The release of the latch members in order to permit removal of the coal chute is effected merely by reversing the operations just described.

In Fig. 5 the same bracket is shown supporting the same type of coal chute but instead of a stud 22 and wing nut 23 the latch member 21 is pivotally secured to the upper portion of the leg 15 on an unthreaded elongated stud 27 which carries a compression spring 28 abutting between the outer side surface of the leg 15 and a washer 29 which is held on the stud by cotter key or the like, 31. In this case the latch is moved to and from locking position and over the end of the stud or pin 25 merely by moving the lower portion of the latch to the left (view in Fig. 5) a sufficient distance to clear the end of stud 25, the spring 28 giving sufficiently to permit this to be done and restoring the latch against the leg 15 as soon as the latch is released.

While I have illustrated and described what is at present a preferred form of the invention and one modification thereof, it will be apparent that the invention may be embodied in other forms and that various other modifications may be made without departing from the invention spirit and the scope of the appended claims.

I claim:

1. Supporting means for a channeled chute equipped with opposed inwardly extending projections along the outer edges of its side flanges, comprising a plurality of spaced apart brackets each equipped with a projection adapted to engage a side flange of the chute between the web of said chute and said projection of said flange for suspending said chute from said flange, a member opposed to said projection and spaced therefrom a distance greater than the width of said projection of said flange for permitting passage of said last named projection past the projection of said bracket, and a manually manipulable member operable to partly bridge the gap between the projection of said bracket and the said member whereby to prevent the escape of said flange from engagement with said projection of said bracket.

2. A means of the type specified comprising a plurality of devices rigidly mounted in spaced apart relation to a side wall of a vehicle body and each presenting a vertically disposed fin equipped between its ends with a recess having a large mouth portion and a downwardly extending relatively narrow inner end portion, said recess adapted to receive the inwardly projecting outer end portion of the flange of a channeled chute intended to be received in said downwardly extending portion of said recess, and a manually operable device pivotally mounted on said fin above said recess and selectively movable and securable into a position to choke the mouth of said recess and into position to leave the same unobstructed for the purposes set forth.

RUFUS SCHENBECK.